United States Patent [19]

Smith, Jr. et al.

[11] Patent Number: 4,493,998

[45] Date of Patent: Jan. 15, 1985

[54] METHOD FOR MONITORING DRILLING MATERIALS FOR GAMMA RAY ACTIVITY

[75] Inventors: Harry D. Smith, Jr.; Dan M. Arnold; Ward E. Schultz, all of Houston, Tex.

[73] Assignee: Halliburton Company, Duncan, Okla.

[21] Appl. No.: 364,837

[22] Filed: Apr. 2, 1982

[51] Int. Cl.³ .............................................. G01V 5/00
[52] U.S. Cl. .................................. 250/252.1; 250/256
[58] Field of Search .................... 250/252.1, 255, 256, 250/253

[56] References Cited

U.S. PATENT DOCUMENTS

| | | | |
|---|---|---|---|
| 3,038,076 | 6/1962 | Scherbatskoy | 250/252.1 |
| 3,435,215 | 3/1969 | Pritchett | 250/252.1 |
| 4,378,498 | 3/1983 | Givens | 250/256 |

*Primary Examiner*—Janice A. Howell
*Attorney, Agent, or Firm*—William J. Beard

[57] ABSTRACT

In the preferred and illustrated embodiment taught herein, method steps for monitoring of raw materials to be used in drilling mud are disclosed. The materials are monitored for radioactivity. Procedures for taking such measurements are disclosed, and the extent of gamma radioactivity in the raw materials used in drilling mud is determined. This is correlated to the increased radiation attributable to mud made from these materials and the effect the mud would have on gamma ray measuring logs. An alternate procedure for testing drilling mud, typically at the well site, is also disclosed. The method detects mud radioactivity from any additives including barite, potassium chloride, well cuttings or others. Excessive background levels due to mud gamma radioactivity in a well may very well mask the data obtained by various logging procedures dependent on gamma radiation. Procedures are also described for either rejecting mud which is too radioactive or correcting the log measurements for mud effects.

10 Claims, 5 Drawing Figures

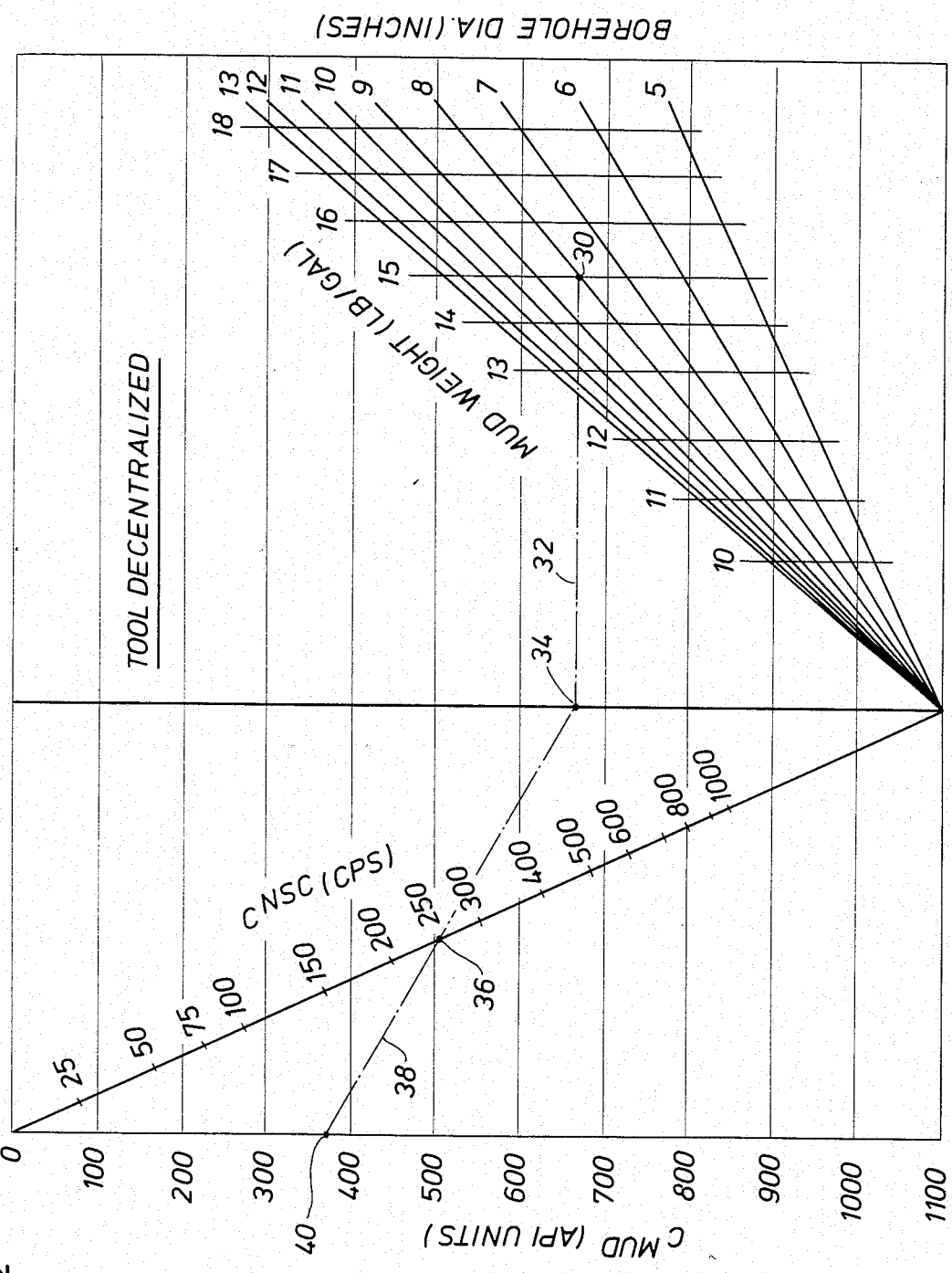
CHART 2

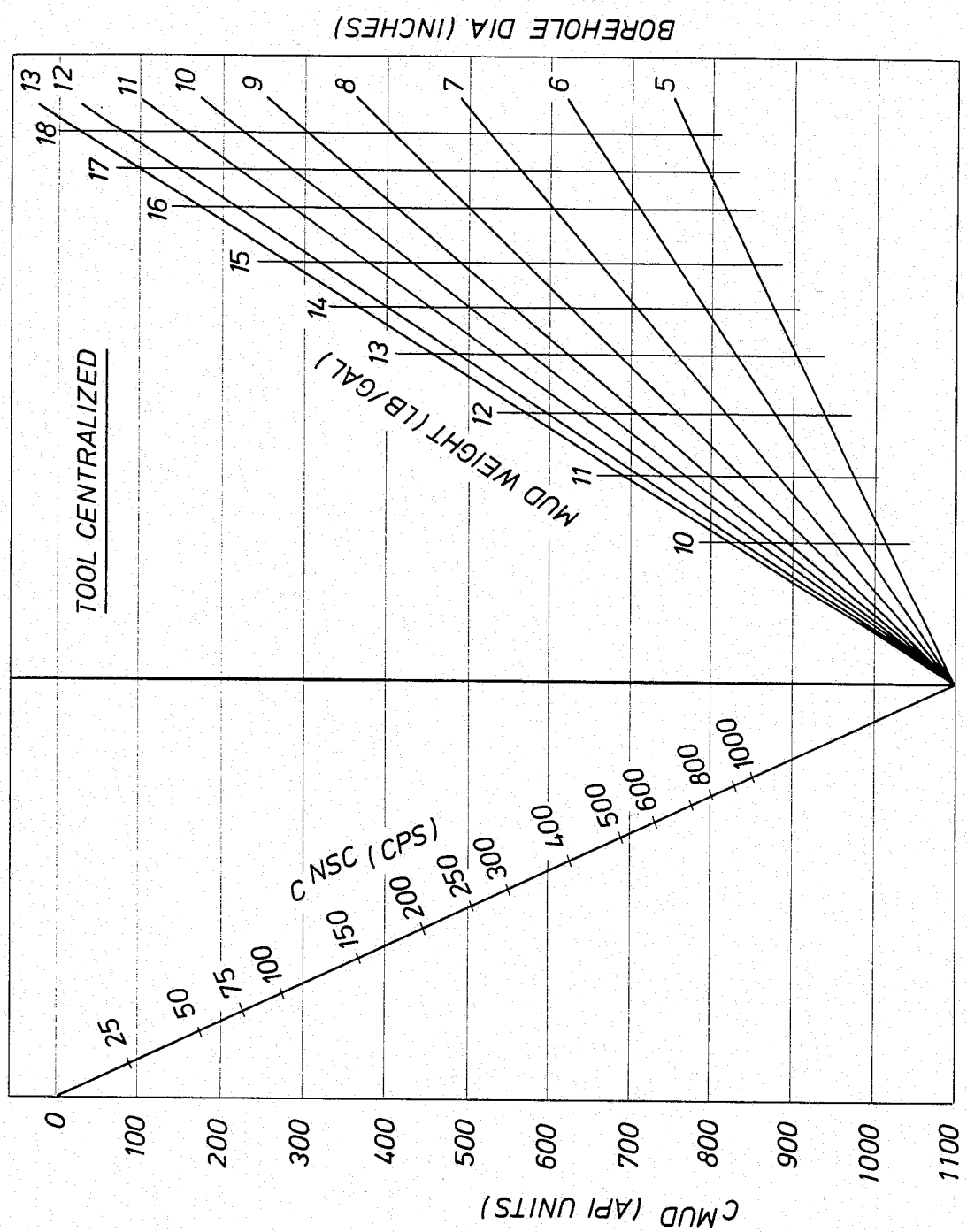

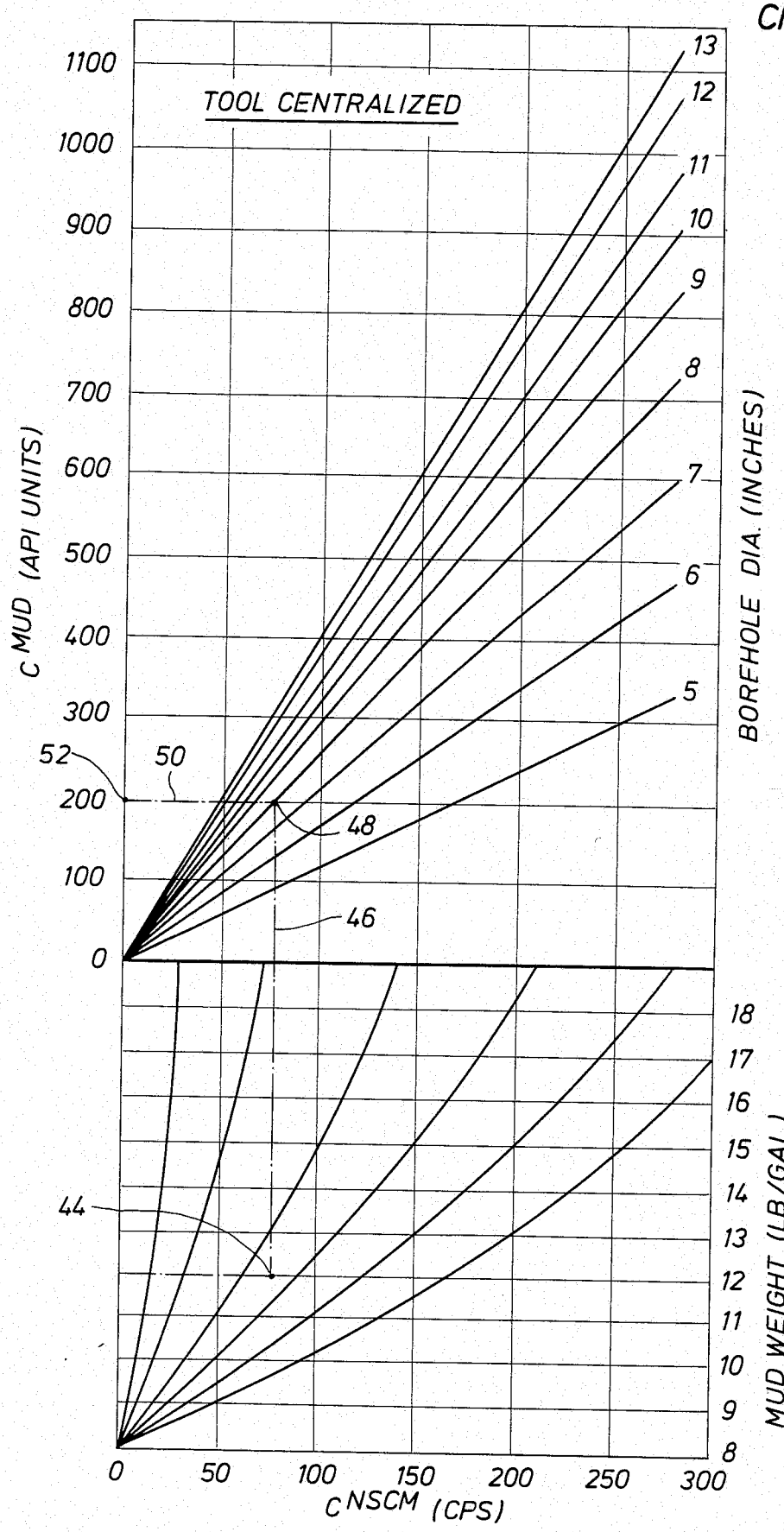

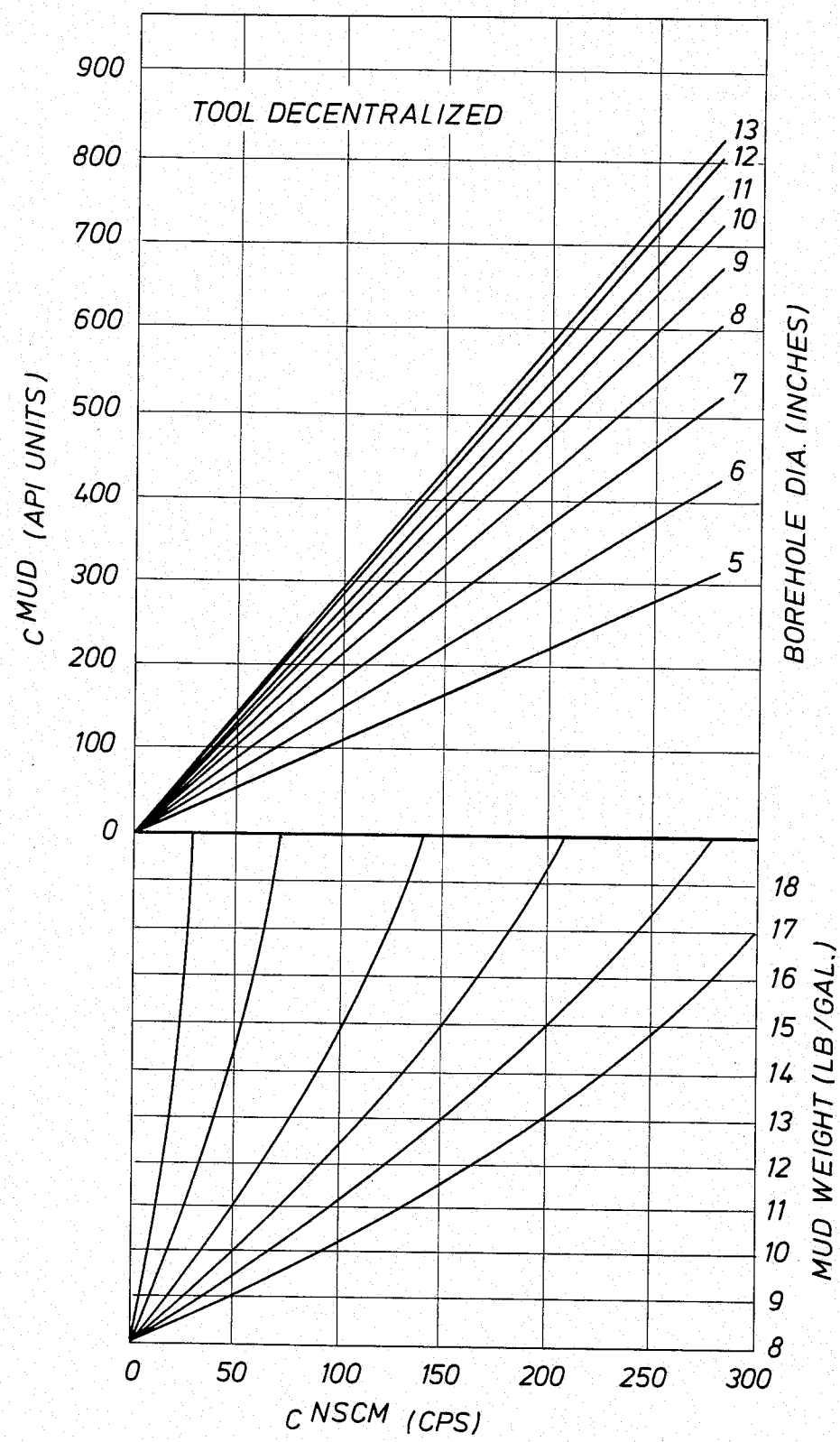
CHART 5

METHOD FOR MONITORING DRILLING MATERIALS FOR GAMMA RAY ACTIVITY

BACKGROUND OF THE DISCLOSURE

Oil wells are drilled ordinarily through use of a rotary drill mechanism which advances a drill bit through the earth's formations. The cuttings are washed away by drilling mud. The drilling mud is circulated through the drill stem and flows back up through the annular bore to the surface. The drilling mud serves a multitude of purposes including the formation of a mudcake on the side wall of the open hole. The drilling mud can be readily described as an aqueous solution, typically including barites, clay and other molecules. In use, the mudcake which is formed on the side wall of the well bore is desirable for a number of practical reasons, and a fluid portion of the drilling mud will penetrate into the formation. This latter portion is normally called the mud filtrate.

Formations penetrated by a well exhibit different levels of naturally occurring gamma ray radiation. In fact, this gamma ray radiation is dependent on the nature of the formation which has been penetrated. Certain measurements are taken using gamma ray radiation measuring tools to determine the nature of the formations. For instance, one technique is to measure the total natural gamma ray radioactivity of the several formations penetrated by the well bore.

A second well logging technique presently in commercial use is the natural gamma ray spectral logging technique, often used to identify clay mineralogy, faulting and other downhole variables. This technique relies on relatively careful and delicate measurements which include ratios of natural gamma ray radioactivity from thorium, uranium and potassium. If the drilling mud contaminates the well bore with any of these elements, this logging technique may well obtain ambiguous or unreliable data. There are other logging techniques which use gamma ray, neutron, or pulsed neutron detectors. While certain of these logging techniques might be less impacted by radioactive drilling mud, it is still possible that highly radioactive mud could create a sufficiently high level of background radiation that collected data would be unreliable.

Another problem that relates to drilling mud is the formation of potentially ingestable radioactive dust or gasses evolved from the drilling mud. Precaution against such ingestion applies to the drilling mud at the drilling site, and the precautions apply to drilling mud in sacks, bags, or in bulk prior to mixing at the well site.

A separate problem arising from the use of mud additives, including barite, is that they may be mined with other compounds and the purification processing is minimal. As an example, the processing of mined barite (naturally occurring barium sulfate) at least begins with mining of the barite (in naturally occurring forms). The treatment procedure involves some degree of purification, grinding to a selected particle size, washing and other purification steps. The mineral processing steps can be relatively expensive, which expense increases depending on the extent and degree to which these steps are carried out. For instance, a common step is crushing of the barite into particles screened by a range of meshes. After crushing, washing and purification steps are ordinarily expensive so they are not undertaken to totally purify barite. One risk that accompanies the minimal cost treatment is the inevitable incorporation of impurities.

The present disclosure is directed to a method for testing raw mud additives, including barites, in the field, either when mined or after crushing, with a goal of avoiding the cost of further processing if certain impurities are detected. Particularly important impurities are those emitting gamma radiation. Because the ore is susceptible to any trace impurity, the ore potentially emits gamma radiation from actinium ($Ac^{228}$), lead ($Pb^{212}$), thallium ($Ti^{208}$), and all daughter products of the decay of thorium ($Th^{232}$). Other radioactive products include uranium-238 (which decays through radium and radon), uranium-234 and potassium-40.

Most of the gamma ray activity in barite tested preliminary to the present disclosure related to the thorium-232 decay series, however, the method discussed herein is not limited to the detection of thorium-232 daughter elements. The method detects the presence of any naturally occurring gamma ray activity. In particular, the method can be used to quantify the background produced by the radioactive isotope $K^{40}$ which is found in muds containing KCl. It should be recognized that the impurities found in a particular mud additive sample may depend on vagaries such as the particular formation where it was mined, depth in the formation where mined, and a number of other variables.

Processed barite, or any other mud additive, at least after grinding, does not necessarily yield information which enables easy extrapolation of background radiation produced by mud made from the barite or by a mudcake formed in a well bore. This is highly variant dependent on many factors. For instance, it depends on the diameter of the well bore and weight of the mud. It also depends on the thickness of any mudcake which might be formed which, in turn, is a function of many other variables. The mudcake is the, more or less, solid cake formed on the side wall of the well bore; it is left there after fluid, from the drilling mud, has percolated into the formation. The mud filtrate, may very well carry with it certain radioactive elements which add to the background radiation observed in the well bore. Normally, so many factors are involved that it is not possible to routinely simply measure the radioactive levels adjacent to a bag or container of ground barite and thereby determine the background radiation level which will occur in a well.

Measurements at the pile or accumulation of ground barite are also important for environmental and local health requirements. For instance, a radioactivity level of about 2 mR/hr is the maximum level above which pile isolation is required. At an accumulation of several thousand tons of barite, radioactivity levels around the surface of the pile are not necessarily indicative of the radiation actually experienced in the well from the mud. Nevertheless, a problem is posed, namely whether or not the barite can be used if radioactivity measurements near the surface indicate some level of radioactivity. In a large mine or processing plant, the raw material is often mined and processed continuously, always altering the stored weight material and the potential of radioactive trace elements. The use of barite having trace radioactive elements adds to the background radiation observed in a well bore.

The foregoing sets forth some of the problems encountered in the use of barites in drilling mud and the impact that the drilling mud has on open hole logs which are run during well drilling with a view of proper completion. The same problems relate to other weight materials. Nothing has been said about tests run after the hole has been cased for radiation levels measured through the metal casing in the hole. The present invention is also concerned with leaving the open hole with a minimum background level so that, even after the well has been cased, the radiation levels are held to a minimum, thereby enabling well logging with radioactivity techniques years thereafter.

In addition to barite testing, other mud weight materials are also susceptible to these test procedures. A popular weight material is potassium chloride (KCl) which contains the radioactive isotope $K^{40}$.

BRIEF SUMMARY OF THE DISCLOSED METHOD

This method relates to a method of verifying the radioactivity levels in raw barite prior to use of the raw barite in drilling mud. Certain gamma ray measurements are taken of the raw barite and extrapolated to a well bore environment using the projected drilling mud weight made from this barite and the dimensions of the well bore. The natural radioactivity occuring in the formations in the vicinity of the well bore are then compared with thee projected levels, consistent with maximum tolerance estimates to enable a determination of whether or not the barite has sufficient radioactive trace elements to forbid its use in a well. Alternatively, the method indicates the ratios by which such additives containing radioactive trace elements must be diluted with nonradioactive additives before use in the drilling mud.

A second use of the method involves mud testing at the well site for radioactivity from mud additives, including barite, KCl, and well cuttings. Additional uses of the method include testing other weight materials prior to or subsequent to addition to the mud, and methods for correcting observed gamma ray measurements for the mud induced background.

BRIEF DESCRIPTION OF THE DRAWINGS

So that the manner in which the above recited features, advantages and objects of the invention, as well as others which will become apparent, are attained and can be understood in detail, a more particular description of the invention, briefly summarized above, may be had by reference to the embodiment thereof that is illustrated in the appended drawings, which drawings form a part of this specification.

DETAILED DESCRIPTION OF PREFERRED METHOD STEPS

Figure 1:
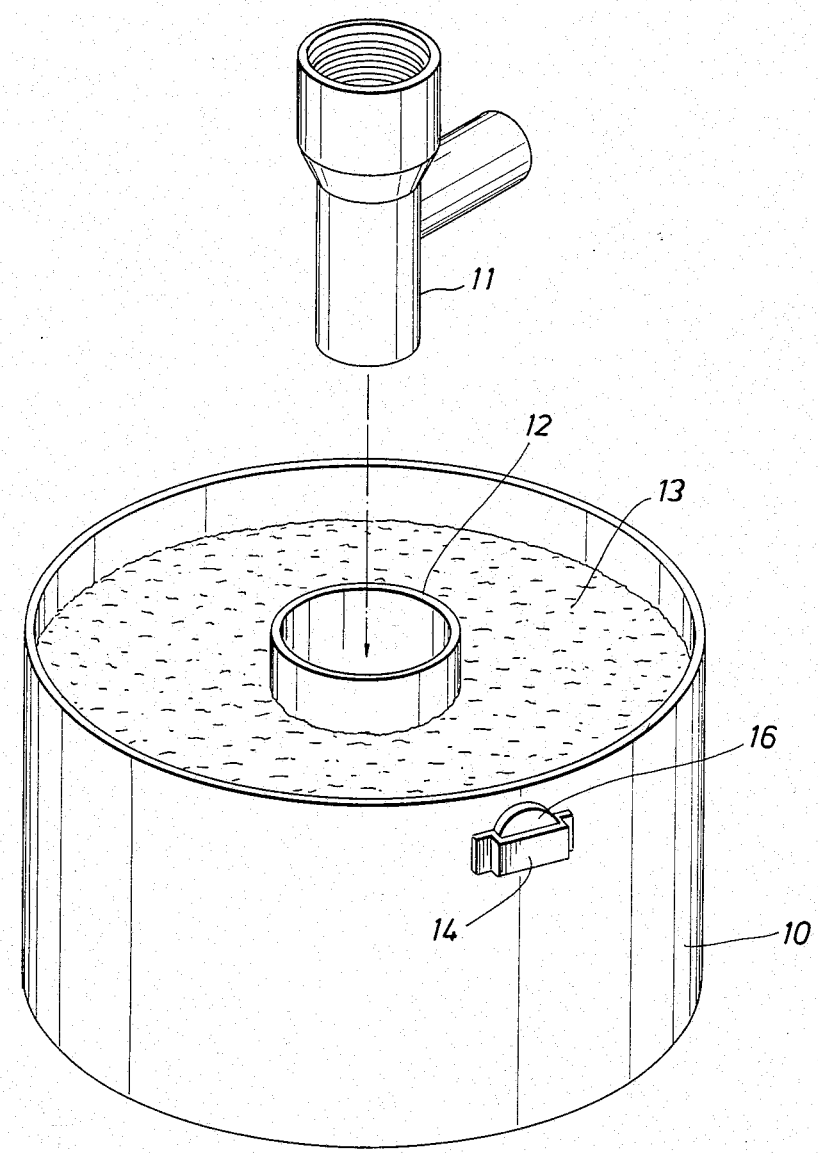
FIG. 1 of the drawings is a test fixture for use in obtaining radioactivity measures in a standardized format.

The method of this invention is useful in several different settings. The first procedure described relates to testing raw ores including barite, typically at a prospective ore body, at a pre-existing barite mine, or processing plant. Another use is testing drilling mud at the well site during drilling. Another and different use is testing other weight materials for their radioactive emissions, either when mined or prior to adding to the mud and to determine whether these materials are suitable for inclusion in mud. One important alternate material is potassium chloride (KCl) for which this method of testing is also applicable. Test procedures are also described for correcting the measurements made by a gamma ray logging device in a well for the presence of radioactivity in the mud.

TEST FIXTURE

In FIG. 1 of the drawings, the numeral 10 identifies a shallow drum or pan. It supports an internal upstanding aluminum pipe 12. The pipe 12 is preferably made of aluminum or some other material which is physically durable yet exhibits minimal attenuation to gamma radiation. An annular space between the drum 10 and the pipe 12 is filled with barite 13 (or other mud additive) in ground or broken pieces. The depth is ideally sufficient that irradiation of the test instrument detector is not influenced by adding more sample.

The pan or circular tray is filled with barite 13 nearly to the rim to a predetermined level. The central tube is four inches in diameter and it is covered by a removable cap during filling. The interior of pipe 12 should be clear of barite during use. The height of the pan 10 is about seven inches, and the diameter is about fifteen and one-fourth inches. A test chamber of this size, configured as shown in FIG. 1, is sufficient to make reproducible measurements.

The apparatus of FIG. 1 is a test fixture. A scintillometer probe 11 is inserted into the pipe 12. The barite sample 13 in the annular space around the pipe 12 mimics mud in a well bore. The aluminum pipe 12 serves as a prop or fixture to prevent the sample from contacting the probe surface.

On most occasions, it will be necessary to place a calibration source or standard a specified distance from the central axis of the pipe 12. To this end, the standard 16 is attached to the exterior of the drum 10 by a clamp 14. One such suitable calibration source is a button of measured strength of cesium-137.

The cesium-137 calibration source 16 is used as a standard so that any make of scintillometer 11 may be calibrated against the standard 16. This defines the reference level. The reference level is necessary to assure that the test instrument is calibrated to a norm, thereby yielding data which is significant in light of industry standards, such as gamma ray logging API units. The reference level must be known as a preliminary or first step.

The test fixture of FIG. 1 is not the only shape and size which will perform satisfactorily. The shape can be modified; the size of the fixture can be varied; the gamma radiation attenuation of the test fixture can be different. The primary criteria for the test fixture is that the device hold sufficient sample that errors in sample measurement are insignificant and that the detector output be calibrated to a known predetermined standard radiation level. Using the fixture shown in FIG. 1, the test sample measures about seven inches deep in the pan. For this configuration, a filling error of one inch does not make any appreciable difference in reading. A change of one inch in pan diameter does not make an observable difference in reading. A change in gamma radiation attenuation, as by changing guage of metal (on the pipe 12) makes little difference if the calibration standard button is properly positioned to include the effects of attenuation through the pipe.

RAW MUD ADDITIVE TESTING

A first technique utilizes raw or minimally processed barite (or other mud constituent) which has been crushed to a suitable range of granular sizes to provide a uniform measurement when placed in the chamber.

While barite, after crushing and after minimal processing to prepare for use as a constituent in drilling mud, should ideally be free of trace elements or compounds which include radioactive elements, in practice, this is not always the case. The present test should be applied to determine if radioactivity from the barite is sufficient to require rejection or dilution with non-radioactive barite prior to use in a well.

Accordingly, the raw barite to be tested need not be ground to any particular mesh size but the barite is typically crushed to relatively small particle size suitable for inclusion in the test fixture. Total drying is not required and barite can include up to about five or ten percent moisture.

The first step involves placing the probe of the scintillometer 11 centered in the pipe 12. With drum or pan surrounding the pipe 12 empty, a count rate is recorded, and this is identified as the count rate $C^e$.

The next step is to calibrate the scintillometer probe. With the probe in the same position in the pipe 12, the standard calibration button 16, a container of cesium-137, is placed in a fixture 14 at the fixed or standard distance from the probe. The counting rate is then recorded and this is identified by the symbol $C^c$. The net calibration reading is obtained by the difference of these two measurements and is identified by the symbol $C^n$.

Utilizing one particular model of apparatus and source strength, the calibrated rate was observed to be about 275 plus or minus 15 counts per second. The model which was used to obtain this data was a Model 346 scintillometer manufactured by Microlab Electronica, S.A. It will be appreciated that the count rate in pulses or counts per second is dependent on the scale factors built into the test instrument. Accordingly, if another instrument is used, the count rate should be multiplied by the particular scale factor described herein, namely $275/C^n$, prior to conversion to API unit calculations. Certain charts were developed assuming 275 counts per second as the calibration. If a calibration source with a different strength were used, a similar normalization procedure would also be required.

The cesium-137 calibration source 16 is then removed from fixture 16 and moved from the chamber to a distance such that its contribution to the count rate is negligible. The test pan 10 is then filled with a specified quantity of raw barite 13. A reasonable standard for the chamber geometry in FIG. 1 is about 25 plus or minus one kg of raw barite which has been crushed or pulverized to a loose granular state. A new reading is taken on the scintillometer and is identified by the symbol $C^{sc}$. The raw sample which was added to the counting chamber shown in FIG. 1 has a specific bulk density (P) in grams per cubic centimeter. Ideally this should be measured for use in equation (1) below, which is used to correct the observed sample count rate in the geometry of FIG. 1 for background attenuation effects.

$$C^{NSC} = C^{SC} - (C^e \times e^{-0.383P}) \quad (1)$$

The latter exponent of equation (1) can be approximated if the bulk density is not known, by assuming that P equals 2.0. This should result in minimal error in the calculation of $C^{NSC}$.

These steps are carried out with raw barite in ground form. However, barite is normally added to water and other additives to form mud. The raw barite is converted into mud of a particular mud weight (pounds per gallon). The mud weight indicates the relative barite concentration, namely, heavy mud has more barite.

The count rates described above must be converted to different units in order to provide quantitative information for use in gamma radiation logging. The barite is assumed to be mixed into muds of differing weights (pounds/gallon), and using this information and hole size, the scintillator count rates can be converted into API units by using $C^{NSC}$ in Charts 2 and 3. Charts 2 and 3 are respectively for decentralized and centralized logging tool positions. One example might suffice. Assume that a raw barite sample has been tested or measured in the manner described above after calibration of the test instrument. A suitable instrument is the Model 346 scintillometer previously named. Assume further that the calculations performed using equation (1) yield a value of 250 counts per second. Assume further that a mud weighing 15 pounds per gallon is to be made from the barite sample yielding the count rate of 250 counts per second. Assume further that it is to be used in an eight inch diameter borehole with the logging tool decentralized. To this end, Chart 2 is used with these particular values to define a point on the graph. Accordingly, the numeral 30 identifies a point determined by the mud weight and hole diameter. A horizontal line 32 is drawn from the point 30 to the adjacent pivot line on the chart, intersecting at the point 34. The count rate 36, $C^{NSC}$, is located on the sloping line. The points 34 and 36 determine the slope of the line 38, and that line intercepts the API ordinate at 40. At the point of intersection, the scale in API standard units reads about 375 API units. Therefore, under the circumstances given above, where the hole is to be eight inches in diameter, the mud weight 15 pounds per gallon, and the measurement of radioactivity yields a count rate in accordance with equation (1) of 250 counts per second, then 375 API units would be added to a gamma ray log due to the mud made from this ore sample. This level of radioactivity exceeds the expected API count rate from formation of interest, and hence would be too high to tolerate in ordinary circumstances. This barite sample indicates that mud should not be formulated from this ore.

Another factor to be noted about Charts 2 and 3 are that they are scaled to accommodate a specific chamber, scintillometer and calibration source strength. Clearly, the count rate scales could be changed if other equipment were utilized.

TEST PROCEDURE INVOLVING MUD SAMPLE AT WELL SITE

The foregoing procedure describes the procedure beginning with raw barite. Another application of this device is directed to making measurements on mud samples at the well site. Monitoring the radioactivity of the mud will enable the log analyst to determine the effect of such radioactivity on the gamma ray log. This radioactivity could be due to weighing materials, such as barite or KCl, or to ground-up radioactive impurities formed on drilling through radioactive formations. Monitoring mud radioactivity may also provide a mechanism for correcting subsequently or concurrently run logs for mud radioactivity effects. Therefore, it is expedient to have a procedure for testing the mud at the well site.

The beginning steps assume the use of the same equipment shown in FIG. 1 and described before, and includes the step of calibration of the scintillometer. In a manner well known, the bulk density of the mud should be determined and expressed in grams per cubic centimeter. The structure of FIG. 1 is again used. It is emptied, and after washing, about 12,000 plus or minus 500 milliliters of mud are placed in it. The scintillometer 11 is placed in the central tube or pipe 12 and a reading is obtained. That reading, $c^s$, and a reading from the test instrument when empty, $c^e$, are both obtained. These are the two factors used in equation (2) below, which corrects the observed count rate for background. The right hand factor, in equation (2), is the empty reading multiplied by an exponential involving the mud density B in grams per cubic centimeter. Once mud density is known and the two readings are measured, then the net (background corrected) count rate, $C^{NSCM}$, can be calculated through the procedure of equation (2), where all count rates are input in consistent units, i.e. counts/second.

$$C^{NSCM} = C^S - (C^e \times e^{-0.383B}) \quad (2)$$

Attention is directed to Charts 4 and 5 which are charts or graphs respectively for centralized and decentralized tool position. Following an example, assume that a 12,000 milliliter sample of mud yields a net scintillometer reading, $C^{NSCM}$, of 80 counts per second. Assume further that the mud has a weight of 12 pounds per gallon. Assume further that the tool is centralized in an eight inch bore hole. This requires the use of Chart 4 of the drawings. The beginning point is located at 44 in the lower part of Chart 4, defined by the mud weight and the count measurement. A vertical line 46 is extended until the line intersects with the appropriate borehole diameter in the upper part of Chart 4. The intersection point is 48. From this intersection, a horizontal line 50 is drawn to the ordinate and intersects at 52. This yields 200 API units, which would be the counts added to the gamma ray log for these particular parameters.

Charts 4 and 5 are also suitable if converted into mathematical formats compatible with digital or analog computers in the logging truck for making automated corrections to the gamma ray log. As long as the mud weight and radioactivity are constant, the bottom graph of Charts 4 and 5, and the located intersection point 44 do not change. Hence, only borehole size measurements are required to determine changes in mud induced API gamma count rate changes. Using caliper measurements for hole size, the mud induced count rate can be continuously computed and the gammar ray log could then be corrected for mud effects prior to outputting on a log.

Without auto-correction, about 10 API units from the drilling mud is about all the mud created radiation that can be tolerated and still obtain a good gamma ray log. If the mud is held significantly under this maximum tolerance, it then avoids ambiguities resulting from mud radioactivity without auto-correction. If the mud has excessive background radioactivity and is not auto-corrected, it may very well give false, artificial or misleading readings as a result of variations in hole size and thickness of the mudcake. Just as importantly, a log taken in one well is often compared with the log derived from another well into the same formation. Those logs are far more valuable when used to compare wells, and such comparisons are severely handicapped if they do not have background (mud induced) radioactivity levels below the acceptable norm, or are not compensated for such mud effects. Hence, use of the test chamber and related charts can define a basis for rejecting mud for use in a well, or preferably, to define auto-correction for the radioactive impurities. The capability for correction or auto-correction is especially important since some mud additives cannot be removed (such as ground-up radioactive formations), or other additives are intentionally introduced into the mud for other purposes (such as KCl). The method of the present invention, therefore, describes a procedure through which the mud can be screened to determine if the mud induces errors in gamma ray logs, and if so, how to correct for it if necessary.

TEST VARIATIONS

The present method can readily test barite at the mine or a crushing plant. The test can be applied at a bagging or bulk plant. The test can be applied to mud collected at the mud pit of a well during drilling or immediately prior to logging. Many variations in testing can be accommodated with a change in scale factors. For instance, the test pan 10 can be large or small; the size is a matter of convenience, so long as a meaningful calibration is obtained and sample volume and background variations do not create sizable count rate changes. The shape can be modified from the circular shape of FIG. 1 to other shapes again with a change in scale factor. The Charts show particular conversion rates, but could easily be adapted for use with alternate measuring containers, different scintillometers, and different calibration standards. In addition, testing of other weight materials (potassium chloride as an example) follows the same procedure taught herein. Changes in the chart scales, i.e. such that the vertical full scale is reduced to 100 API units or less, can also be done to facilitate accurate determination of lower activity levels.

CHART USE AND PREPARATION

The charts 2–5 are relatively easy to store in computer memory either as look up tables or in equation form. A logging truck computer, with memory, can execute Chart conversion from measured data to obtain mud induced radiation contributions, preferably in API units. In open hole, a measurement of actual hole diameter (as opposed to nominal diameter) along the wellbore is possible, and can be input to the computer to provide a continuous calculation of the mud related radioactivity (dynamically obtained by continuously consulting the Charts). The background radiation can be logged against depth, and as described earlier, can also be used to auto-correct the gamma ray log prior to presentation.

Barites have been mentioned often in this disclosure. Recently, KCl has become more important as a mud additive. This procedure is successful in determining background radiation from the mud with any additive, whether inadvertently, intentionally, or unavoidably introduced. Modification to the concepts described herein could also be applied to determine radioactivity effects from cement in cased holes.

The Charts are derived from actual measurements in a test well. Test wells are readily available in laboratory circumstances in which a borehole in a test pit provides a suitable simulation of an actual borehole. Such laboratory measurements are compiled in Chart form for the variables (such as mud weight) and have the general appearance of those shown in Charts 2–5. It should be appreciated that different logging tools may result in the need for slight chart modifications.

While the foregoing is directed to the preferred embodiment, the method is described by the claims which follow.

We claim:

1. A method of quantitatively determining the amount of background gamma ray radioactivity which would be detected in a gamma ray sensitive logging tool in a wellbore due to the presence of naturally occurring radioactive materials in drilling fluid comprising the steps of:
   (a) placing a sized sample of drilling fluid in a container;
   (b) positioning a sensor means in said container at a position where said sensor means is exposed to gamma radiation from said sample to form an output indicative of gamma ray radioactivity of said sample; and
   (c) converting said sensor means output according to a predetermined functional relationship into an output value indicative of the gamma radiation background which the drilling fluid would induce in a gamma ray measuring logging device as a function of drilling fluid density and wellbore diameter.

2. The method of claim 1 wherein said drilling fluid sample is placed in the container to a specified depth and said sensor means is placed in a predetermined position in the container.

3. The method of claim 1 wherein said sample contains particulate barite.

4. The method of claim 1 wherein said sample contains a potassium salt additive.

5. The method of claims 1 or 2 wherein said sensor means is initially calibrated prior to placing said sample in the container.

6. The method of claim 5 including a preliminary step of reading said sensor means prior to placing a sample in the container; and
   thereafter reading said sensor means without said sample and with a radiation standard source to obtain two measurements for calibration of said sensor means.

7. The method of claim 1 wherein crushed raw ore is used as said sized sample.

8. The method of claim 1 wherein processed mud additives are used as said sized sample.

9. The method of claim 7 including the step of measuring the bulk density of the ore prior to placing the ore in said container wherein the step of coverting includes the following background correction relationship:

$$C^{NSC} = C^{SC} - (C^e \times e^{-KP})$$

where
$C^e$ = count rate without sample
$C^{SC}$ = count rate with sample
$C^{NSC}$ = net count rate
$K$ = a constant
$P$ = bulk density in weight/cubic measure.

10. The method of claim 1 including the step of measuring the density of the drilling fluid, and wherein the step of converting includes the following background correction relationship:

$$C^{NSCM} = C^{sc} - (C^e \times e^{-KB})$$

where
$C^e$ = count rate without sample
$C^{sc}$ = count rate with sample
$C^{NSCM}$ = net count rate of mud
$K$ = a constant
$B$ = drilling mud density in weight per cubic measure.

* * * * *